UNITED STATES PATENT OFFICE.

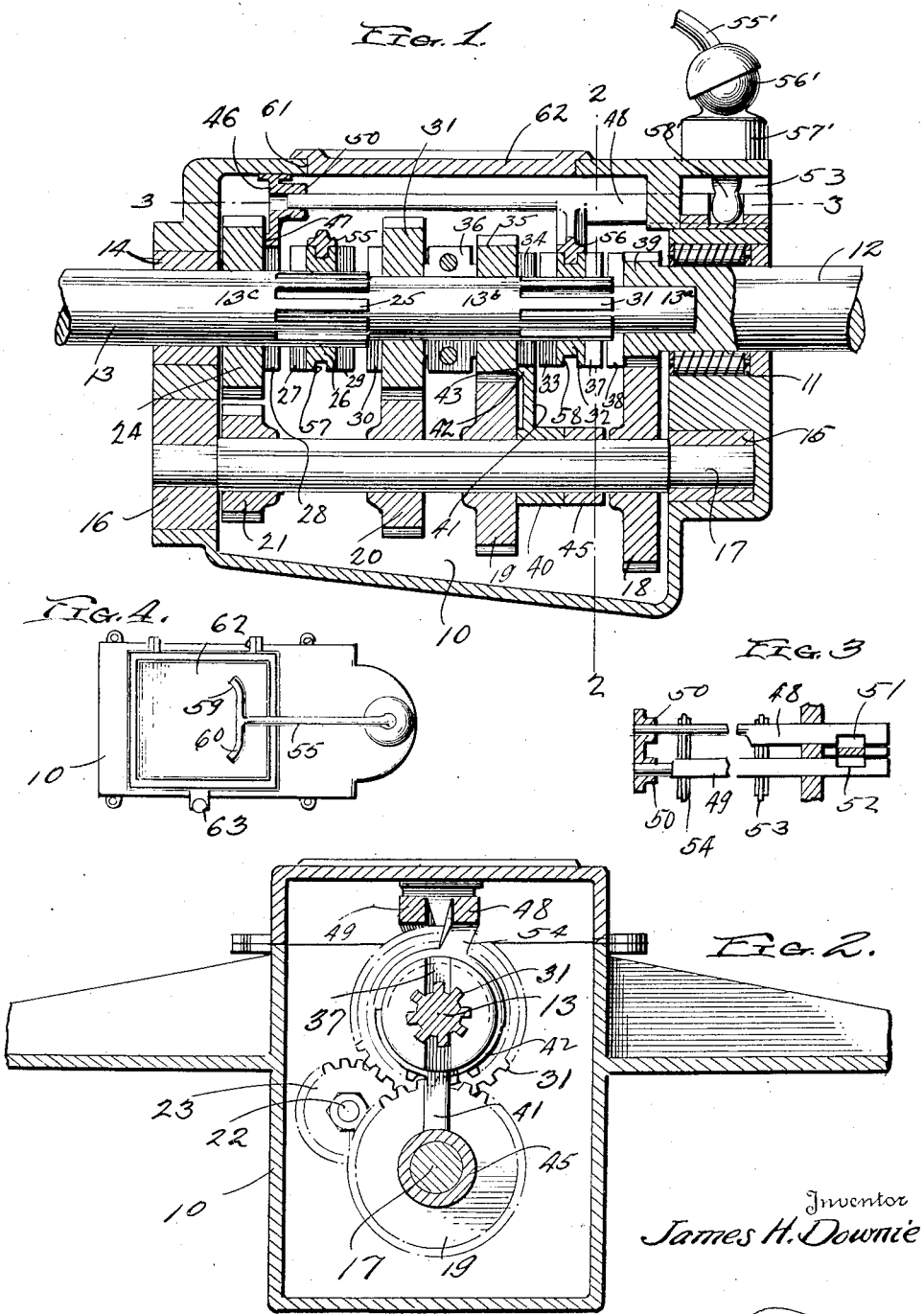

JAMES H. DOWNIE, OF SAN ANTONIO, TEXAS.

TRANSMISSION-GEAR.

1,348,160.     Specification of Letters Patent.     Patented Aug. 3, 1920.

Application filed September 15, 1919. Serial No. 323,755.

*To all whom it may concern:*

Be it known that I, JAMES H. DOWNIE, a citizen of the United States, residing at San Antonio, in the county of Bexar, State of Texas, have invented certain new and useful Improvements in Transmission-Gears; and I do hereby declare the following to be a full, clear, and exact description of the invention, such as will enable others skilled in the art to which it appertains to make and use the same.

This invention relates to transmissions for motor vehicles and it has for its object to provide an improved construction wherein the various gears remain in mesh at all times, as distinguished from being shifted, and in which the different speeds as well as the reverse, are obtained by clutching different selected drive gears to the drive shaft of the transmission.

A further object of the invention is to provide means for effectively holding the loose gears of the drive shaft against longitudinal movements during both the clutching and unclutching operations.

An additional object of the invention is to provide a construction of transmission drive shaft that will permit of assembling its gears over the splines through the medium of which the clutch members are held against rotation while their movement longitudinally of the shaft is permitted.

The invention has also for its object the provision of an improved shift lever that is operable by the foot of the driver and is located from over the gears, whereby to permit of a maximum opening in the transmission housing for introduction of lubricant, inspection of parts and other uses.

Other objects and advantages of the invention will be understood in the following description:

In the drawings:

Fig. 1 is a section taken vertically through the transmission in a plane including the axes of the drive and counter shafts, parts being in elevation and the clutches being shown in their neutral positions.

Fig. 2 is a transverse section taken vertically through the structure on the line 2—2 of Fig. 1.

Fig. 3 is a section on line 3—3 of Fig. 1, horizontally through the structure, the shift rods being however in top plan and the gears and directly associated parts being omitted, the view serving to show the relation of the two shift rods to each other and to the shift lever with the slidable mounting of the rear ends of the shift rods in the upper gear keeper that depends from the top of the housing.

Fig. 4 is a top plan view of the apparatus, showing the extent of the top closure and the manner of mounting it and illustrating also the pedal of the foot shift-lever.

Referring now to the drawings, the present transmission includes a housing 10 at the forward end portion of which is arranged the usual bearing 11 in which is received the engine shaft 12 which latter is connected in the usual manner with the forward end of the driven shaft 13 having a bearing 14 in the rear end of the transmission housing. In the ends of the housing and below the bearings 11 and 14 respectively are other bearings 15 and 16, that receive the counter shaft 17 having fixed upon it the main counter pinion 18, the intermediate speed counter pinion 19, the low speed counter pinion 20 and the reverse counter pinion 21, respectively, there being also a stub shaft 22 projecting from the rear wall of the housing, that carries the reverse idle pinion 23 that meshes at all times with the pinion 21.

It will be noted upon reference to Fig. 1 of the drawings that the forward end portion 13$^a$ of the shaft 13 is materially reduced in diameter where it has its bearing in the end of the engine shaft 12, that the intermediate portion 13$^b$ of the shaft is of increased diameter while the rear portion 13$^c$ that enters the housing and is within the rear end portion of it has the normal diameter of the shaft body. Upon the portion 13$^c$ is mounted the reverse driven pinion 24 that meshes at all times with the idler 23 and which in assembling the structure, is slipped over the portions 13$^a$ and 13$^b$ and onto the portion 13$^c$, successively, in which latter position it is normally loose on the driven shaft.

The forward end of the major portion 13$^c$ of the driven shaft is longitudinally slotted at intervals with resultant evenly spaced, integral splines 25 upon which is slidably mounted a double-faced clutch member 26 the jaws 27 at one end of which are movable into and out of engagement with the corresponding jaws 28 on the adjacent end face of the gear 24, while the jaws 29 at its opposite end are movable with the clutch member into and out of engagement with the corresponding jaws 30 on the rear end face of a driven gear 31. The latter is rotatably mounted on the intermediate portion 13$^b$ of the driven shaft at the front ends of the splines 25. To bring said gear to this position it is slipped over the minor portion 13$^a$ of the driven shaft and over the splines 31 that are formed integral at the forward end portion of the part 13$^b$, by longitudinally slotting the said part at regular intervals. Upon the splines 31 is slidably mounted a second clutch member 32 having clutch jaws 33 at one end face that are movable with the clutch member into and out of engagement with the clutch jaws 34 on the corresponding end face of a driven gear 35. This is rotatably mounted also upon the portion 13$^b$ of the driven shaft and is held in spaced relation to the driven gear 31 by means of a common form of split collar 36 that is clamped about the portion 13$^b$. At the other end of the clutch member 32 are the jaws 37, which when the member 32 is shifted forwardly to its limit, engage the jaws 38 upon the rear end face of the main drive pinion 39 that is fixed or formed upon the rear end of the engine shaft 12.

The gear 31 is at all times in mesh with the pinion 20, the gear 35 is at all times in mesh with the pinion 19, and the pinion 39 is at all times in mesh with the pinion 18. The clutch members, being at all times rotatable with the driven shaft 13, the movement of a clutch member to engage any of the corresponding gears on the driven shaft, will effect rotation of the driven shaft in a corresponding direction and at a corresponding speed, through the medium of the counter shaft and its corresponding pinion. When however the clutch member 32 is shifted forwardly to engage its jaws 37 with the jaws 38 of the driving pinion 39, then the driven shaft 13 will be clutched to the engine shaft 12 to rotate with it and at its speed, and the drive will be direct.

To prevent movement of the driven gear 35 away from the collar 36 when the clutch member 32 is drawn from it, a keeper is provided and includes a hub 40 that is mounted loosely on the shaft 17 and from which radiates upwardly an arm 41 having a yoke 42 at its upper end that straddles the driven shaft and the clutch jaws 34, from beneath, and which yoke has an arcuate flange 43 that bears against the end face of the driven gear 35 beyond the jaws 34. The hub 40 of this keeper bears at one end against the counter pinion 19 and at its other end against a collar 45 on the counter shaft, which collar at its other end abuts the main counter pinion 18.

The driven gear 24 is held against movement with the clutch member 26 away from the rear end of the transmission housing 10 by means of an arm 46 that depends from the top of the housing 10 and has at its lower end an arcuate flange 47 that bears against the front face of the gear beyond its jaws 28.

To shift the clutch members 26 and 32 there are provided two shift rods 48 and 49, the rear end portions of both of which have slide bearings in the arm 46 and the bosses 50 that project from it. These rods 48 and 49 are parallel and have their forward end portions squared and passed slidably through the front wall of the housing 10, beyond which their mutually adjacent faces are notched or recessed as shown at 51 and 52 respectively, the recesses being mutually opposite. These recessed end portions of the rods, it will be noted are exterior to the gear containing portion of the housing and are in a separate compartment 53, forwardly thereof. Depending from the rods 48 and 49 are the shifter arms 53 and 54 having each a yoke 55 and 56 respectively that engage in the circumscribing channels 57 and 58 respectively of the clutch members 26 and 32 respectively whereby when either of the rods is reciprocated the corresponding clutch member is similarly removed to effect action of the various gear trains hereinbefore described.

To reciprocate the rods 48 and 49 selectively, a shift lever 55' has a common form of universal rocking connection 56' with a bracket 57' on the transmission housing and below this connection, the lever terminates in a finger 58' which is so positioned that when the lever 55' is swung laterally, this finger will engage the recess 51 or the recess 52, depending upon the direction in which the lever is swung or rocked. If the lever is then rocked forwardly or rearwardly, the shift rod with which its finger is engaged is reversely moved. It will be noted that the upper end of the shift lever is provided with laterally directed cross bar 59 having rearwardly and upwardly turned outer ends 60, the bar being of such length that the foot of the driver may be shifted from one end to the other to rock the lever when presure is then applied, while the angle at which the lever extends upwardly and rearwardly is such that it may be conveniently shoved forwardly to move a shift rod rearwardly or may be shoved rearwardly and downwardly, to move a shift rod forwardly.

By positioning the shift lever as shown, an opening 61 of maximum size may be formed in the top of the housing 10 for application and removal of lubricant and for inspection as well as for application and removal of the contained parts, there being illustrated a hinged cover 62 that is held securely in closed position by the screw 63 or other suitable fastener.

What is claimed is:

In a transmission including alined drive and driven shafts, the latter being stepped and having splines at the extremities of its steps, the combination with a driving gear fixed on the driving shaft, a counter shaft having fixed gears one of which meshes with said driving gear, gears connected with its other fixed gears and loose on the driven shaft, said loose gears and the driving shaft gear disposed in pairs and provided with clutch jaws facing each other, and a split collar fast on the driven shaft between the contiguous members of said pairs; of clutches slidable on said splines, means for actuating them selectively, a housing inclosing the mechanism, an arm on the housing having a flange engaging one loose gear at a point radially beyond its jaws, and a hub loose on the counter shaft and having a radial arm with a flange engaging another loose gear beyond its jaws, as described.

In testimony whereof, I affix my signature, in the presence of two witnesses.

JAMES H. DOWNIE.

Witnesses:
E. IRVIN BURNS,
L. R. BEALOR.